United States Patent
Meneghin et al.

(10) Patent No.: US 10,331,814 B2
(45) Date of Patent: Jun. 25, 2019

(54) FORECAST-BASED REFINEMENT AND LOAD BALANCING FOR PREDICTION OF ADVECTION-DIFFUSION PROCESSES

(71) Applicant: International Business Machines Corporation, Armonk, NY (US)

(72) Inventors: Massimiliano Meneghin, Toronto (CA); Noreen O'Brien, Dungarvan (IE); Fearghal O'Donncha, Galway (IE); Emanuele Ragnoli, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 782 days.

(21) Appl. No.: 14/962,502

(22) Filed: Dec. 8, 2015

(65) Prior Publication Data

US 2017/0161411 A1    Jun. 8, 2017

(51) Int. Cl.
*G06F 17/50* (2006.01)
(52) U.S. Cl.
CPC ...... *G06F 17/5009* (2013.01); *G06F 17/5018* (2013.01); *G06F 2217/16* (2013.01)
(58) Field of Classification Search
CPC ............. G06F 17/5009; G06F 17/5018; G06F 2217/16
USPC ........................................................... 703/9
See application file for complete search history.

(56) References Cited

U.S. PATENT DOCUMENTS

| | | | |
|---|---|---|---|
| 6,292,822 B1 | 9/2001 | Hardwick | |
| 8,806,003 B2 | 8/2014 | Brown et al. | |
| 9,038,088 B2 | 5/2015 | Phull et al. | |
| 2007/0112723 A1 | 5/2007 | Alvarez et al. | |
| 2010/0145668 A1 | 6/2010 | Fisher et al. | |
| 2013/0304430 A1* | 11/2013 | Jolliff ................. | G06F 17/5009 703/2 |

(Continued)

FOREIGN PATENT DOCUMENTS

CN    102043887 A    5/2011

OTHER PUBLICATIONS

Witherden et al. "PyFR: An open source framework for solving advection-diffusion type problems on streaming architectures using the flux reconstruction approach" ELSEVIER Computer Physics Communications vol. 185, Issue 11, Nov. 2014, pp. 3028-3040.*

(Continued)

*Primary Examiner* — Saif A Alhija
(74) *Attorney, Agent, or Firm* — Francis Lammes; Stephen J. Walder, Jr.; Kurt P. Goudy

(57) ABSTRACT

A mechanism is provided for targeted, iterative refinement of advection-diffusion model grid resolution. A simulation is executed of advection-diffusion processes for an area associated with a user-defined location. Responsive to detecting an event within a subset of cells of a first set of cells, the subset of cells is refined such that each of the subset of cells is gridded to comprise a second set of cells with dimensions less than the first set of cells. A number of run-time floating-point operations per second (FLOPS) of the model is computed for each of the first set of cells and the second set of cells. Based on a collective time associated with a computed number of FLOPS failing to exceed the user-defined constraint, the simulation continues to execute with the first set of cells and the second set of cells. The process is repeated until a predetermined resolution value is met.

18 Claims, 4 Drawing Sheets

(56) References Cited

U.S. PATENT DOCUMENTS

2013/0317749 A1  11/2013  Borger et al.

OTHER PUBLICATIONS

Mandli, Kyle T. et al., "Adaptive mesh refinement for storm surge", http://arxiv.org/pdf/1401.5744.pdf, Jan. 23, 2014, 31 pages.
McInnes, L. et al., "Computational Quality of Service in Parallel CFD", http://ftp.mcs.anl.gov/pub/tech_reports/reports/P1283.pdf, 2005, 6 pages.

* cited by examiner

FORECAST-BASED REFINEMENT AND LOAD BALANCING FOR PREDICTION OF ADVECTION-DIFFUSION PROCESSES

BACKGROUND

The present application relates generally to an improved data processing apparatus and method and more specifically to mechanisms for forecast-based refinement and load balancing for prediction of advection-diffusion processes.

Convection is the collective motion of particles in a fluid and actually encompasses both diffusion and advection. Advection is the motion of particles along the bulk flow, while diffusion is the net movement of particles from high concentration to low concentration. Advection is typically described using the following partial differential equation:

$$\frac{\partial \psi}{\partial t} + \nabla \cdot (u\psi) = 0$$

Diffusion is typically described using the following partial differential equation:

$$\frac{\partial \psi}{\partial t} = \nabla \cdot (D\nabla \psi)$$

where ψ is the quantity in consideration, u is the fluid velocity, and D is the diffusion coefficient (sometimes called the diffusivity). While there are some nuances to the combined effect for convection (e.g. forced, natural, gravitational mechanisms), the general definition for convection is the total motion. That is, convection is the sum of fluid movement due to bulk transport of the media (like the water in a river flowing down a stream—advection) and the brownian/osmotic dispersion of a fluid constituent from high density to lower density regions (like a drop of ink slowly spreading out in a glass of water—diffusion). Thus, convection covers the sum of transport both by diffusion and by advection.

In meteorology and physical oceanography, advection often refers to the horizontal transport of some property of the atmosphere or ocean, such as heat, humidity or salinity, and convection generally refers to vertical transport (vertical advection). Advection is important for the formation of orographic clouds (terrain-forced convection) and the precipitation of water from clouds, as part of the hydrological cycle.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for targeted, iterative refinement of advection-diffusion model grid resolution in response to predefined event forecasts. The illustrative embodiment executes a simulation of advection-diffusion processes for an area associated with a user-defined location where a forecast has been requested. The illustrative embodiment refines the subset of cells such that each of the subset of cells is gridded to comprise a second set of cells with dimensions less than the first set of cells in response to detecting an event within a subset of cells of a first set of cells. The illustrative embodiment computes a number of run-time floating-point operations per second (FLOPS) of the model for each of the first set of cells and the second set of cells in order to provide the forecast. Based on the computed number of FLOPS, the illustrative embodiment determines whether a collective time associated with the computed number of FLOPS exceeds a user-defined constraint for providing the forecast. The illustrative embodiment continues to execute the simulation with the first set of cells and the second set of cells in response to the collective time failing to exceed the user-defined constraint. The illustrative embodiment repeats the process of refinement of cells within the area until an optimal resolution, i.e. a resolution value above a predetermined resolution value, for each of the cells is met.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
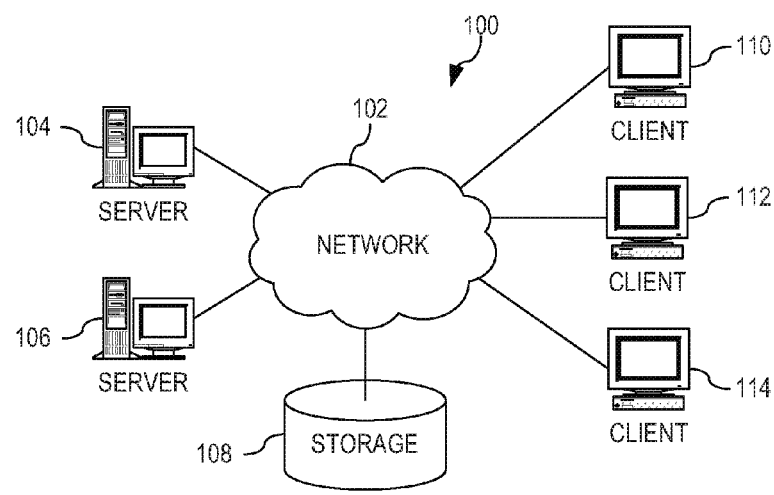
FIG. 1 is an example diagram of a distributed data processing system in which aspects of the illustrative embodiments may be implemented.

The illustrative embodiments provide mechanisms for forecast-based refinement and load balancing for prediction of convection processes, i.e. advection-diffusion processes, as used hereafter. As noted above, in meteorology and physical oceanography, advection often refers to the horizontal transport of some property of the atmosphere or ocean, such as heat, humidity or salinity, and convection generally refers to vertical transport (vertical advection). Advection is important for the formation of orographic clouds (terrain-forced convection) and the precipitation of water from clouds, as part of the hydrological cycle. Currently, forecasting practices consist of parallel grid refined applications with refinement typically fixed in time or reactive rather than predictive (e.g. Regional Ocean Modeling System (ROMS), Princeton Ocean Model (POM), hurricane model tracking eye, or the like.). Load balancing, either user defined or algorithm identified, provides "best-available" decomposition (e.g. based on communication versus computation time).

Precise and detailed prediction using advection-diffusion processes are critical to a large number of applications, such as forecasting of atmospheric or oceanic conditions. In forecasting, the finer the grid the more accurate the area prediction. Temporally dynamic events occur that affect the complexity and importance of the solution in space and time (e.g. storm event in modelling coastal ocean flows, road traffic density in air quality models, or the like). Applying a high-resolution grid everywhere is an expensive and inefficient approach. A targeted system that identifies a best grid distribution in space based on available compute resources is an efficient method of balancing prediction precision with computational resource. Thus, the illustrative embodiments provide for targeted, iterative refinement of advection-diffusion model grid resolution in response to predefined event forecasts, provide solutions across wide geographic areas with a solution tailored to identified regions of high importance/interest, and provide efficient deployment of available compute resources to reach the solution. That is, the illustrative embodiments refine a grid of a model simulation (e.g. ocean circulation model, air quality model, or the like) based on an event model (e.g. weather model, model of industrial releases into coastal waterbody, or the like), which guides the refinement.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
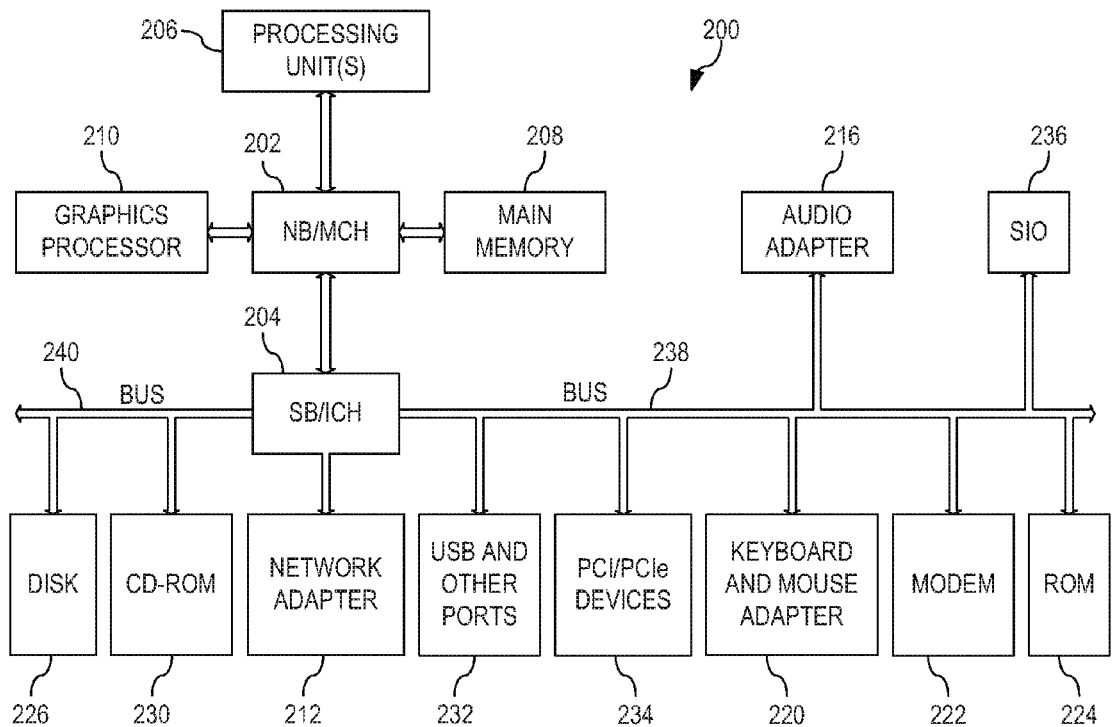
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet. Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g. server 104 may be specifically configured to implement a forecast-based refinement and load-balancing mechanism for prediction of advection diffusion processes. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates targeted, iterative refinement of advection-diffusion model grid resolution in response to predefined event forecasts.

As noted above, the mechanisms of the illustrative embodiments utilize specifically configured computing devices, or data processing systems, to perform the operations for targeted, iterative refinement of advection-diffusion model grid resolution in response to predefined event forecasts. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the forecast-based refinement and load-balancing mechanism for prediction of advection diffusion processes.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

As stated previously, the illustrative embodiments provide a mechanism for a targeted, iterative refinement of advection-diffusion model grid resolution in response to pre-defined event forecasts, for example, refining a grid of a model simulation (e.g. ocean circulation model, air quality model, or the like) based on an event model (e.g. weather model, model of industrial releases into coastal waterbody, or the like), which guides the refinement. The mechanism automatically updates a model grid based on output from an event model that provides pertinent forecasts, such as near-term weather forecasts, point source releases, or the like. The mechanisms dynamically incorporates and/or releases high-performance computing (HPC) resources, whether user defined, computationally identified, or the like, to a current simulation. The mechanism automatically computes the model run-time and provides a targeted, iterative update of one or more model grids based on the available UPC resources, the event model, and user specified run-time constraints using a grid refinement algorithm and a monitoring and run-time algorithm that computes execute time of specified configuration. Thus, the mechanisms provide an increased precision of solution by combining spatial distribution of grid with available compute resources, and pre-defined, known model run-time, such as real-time operational capacity. Thus, the mechanisms are highly valuable in real-time coastal event systems because the mechanisms combine increased spatial data provisioning with predefined run-time constraints.

Figure 3:
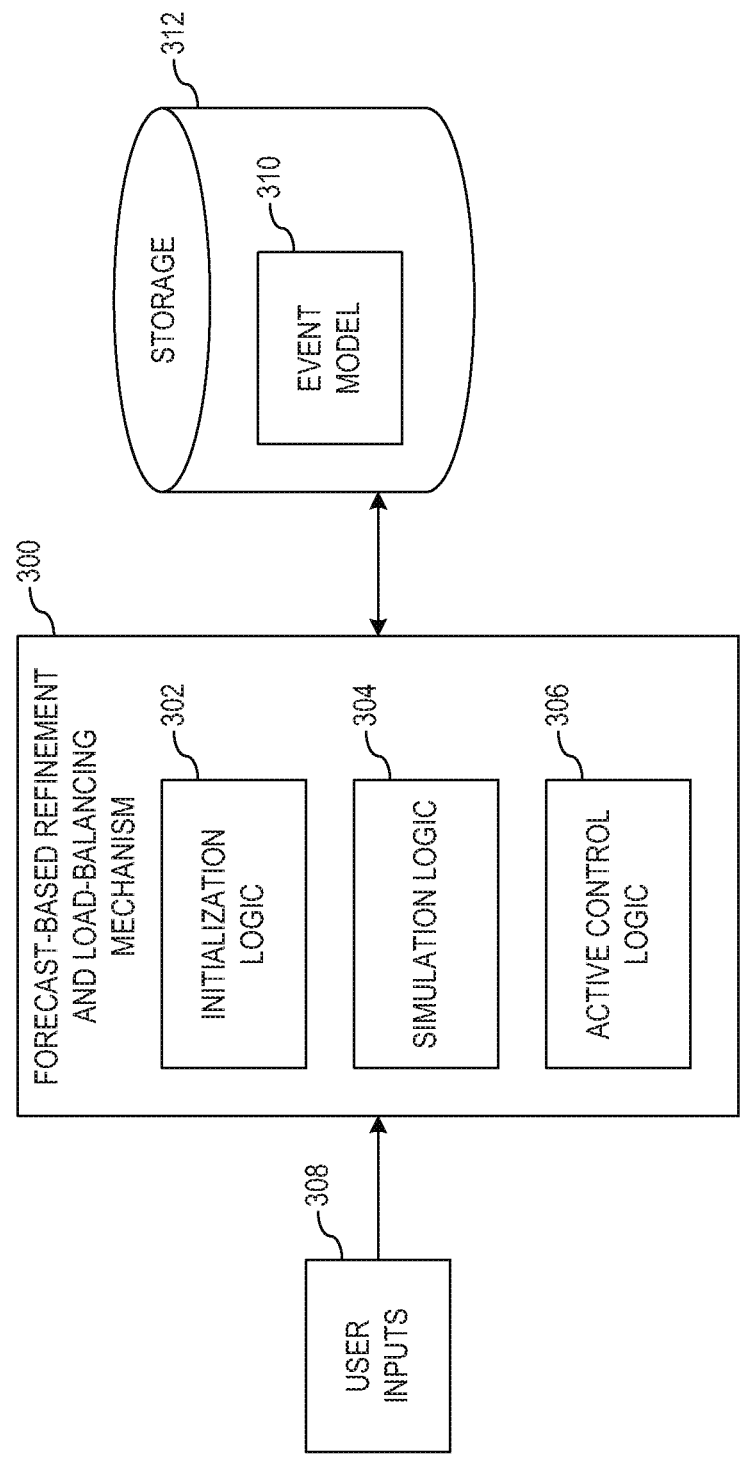
FIG. 3 depicts a functional block diagram of a forecast-based refinement and load-balancing mechanism for targeted, iterative refinement of advection-diffusion model grid resolution in response to forecasts from a pertinent event model in accordance with an illustrative embodiment.

FIG. 3 depicts a functional block diagram of a forecast-based refinement and load-balancing mechanism for targeted, iterative refinement of advection-diffusion model grid resolution in response to forecasts from a pertinent event model in accordance with an illustrative embodiment. Forecast-based refinement and load-balancing mechanism 300 comprises initialization logic 302, simulation logic 304, and active control logic 306. At initialization of forecast-based refinement and load-balancing mechanism 300, initialization logic 302 receives one or more user inputs 308 identifying, for example, a set of rules, constraints, thresholds, or the like, such as a time constraint for providing an advection-diffusion model forecast for an area of interest (i.e. model runtime), a minimum resolution value for the area(s) where the forecast is being provided, a set of thresholds for the forecast to be provided, or the like. Initialization logic 302 also receives an event model, i.e. a user-defined definition of a pertinent event model (e.g. model of wind speeds, power station flue releases, or the like) that impacts the forecast that is being requested (e.g. ocean circulation, air quality, or the like), as well as the location where the forecast is being requested and a time frame for the forecast, i.e. 6 hours, 12 hours, 24 hours, or the like. Additionally, initialization logic 302 either receives or identifies available high-performance computing (HPC) resources, i.e. processing cores, memory, or the like, that are available to provide the forecast that is being requested.

The following utilizes an example of a weather model as the event model that is guiding refinement, and an ocean circulation model as the model for which forecast-based refinement and load-balancing mechanism 300 refines the grid. Utilizing the input information, simulation logic 304 overlays a N by N grid over the coastal area or domain associated with the user-defined location where the forecast has been requested. That is, for the area of interest, a N by N grid of a base horizontal and vertical resolution of N feet, miles, meters, or the like, between grid points may be overlaid over the area or domain associated with the user-defined location. Once the grid is overlaid, simulation logic 304 executes a simulation of the hydrodynamic circulation for the area utilizing, for example, currents, temperature, salinity, water quality, or the like. Concurrently, weather forecasts for the domain are accessed and defined as event forecasts guiding the targeted grid refinements for the circulation model. When simulation logic 304 identifies an event within the weather forecast data that is above a predetermined threshold of being a significant event, i.e. an event that warrants particular attention for the user, for example, high wind speeds, simulation logic 304 notifies active control logic 306 of the significant event. Active control logic 306 automatically activates a regridding of the area associated with the significant event for the circulation model. That is, for the subset of grids associated with the area in which the significant event has been identified, active control logic 306 regrids the subset of grids such that the base horizontal resolution is N-n feet, miles, meters, or the like, between grid points.

Based on the regridding and the subset of grids where the significant event is occurring, active control logic 306 quantifies the available HPC resources and reallocates the resources such that more resources are allocated to the area where the significant event is occurring and less resources are allocated to the other areas that do not have events occurring that are above the predetermined threshold of being a significant event. In order to quantify the HPC resource for allocation, active control logic 306 computes the total number of run-time floating-point operations per second (FLOPS) of the model to produce a numerical solution to the advection-diffusion equation based on the refined model grids and the length of forecast required (e.g. 6 hour, 12 hour, 24 hour, etc.), as defined by the user. Active control logic 306 balances FLOPS expense and therefore HPC requirements in areas with a more refined grid where a significant event is identified as occurring and elsewhere. That is, less HPC resources are going to be required to generate a forecast in areas where no significant event is occurring while more HPC resources are going to be required to provide a forecast in an area where a significant event is occurring.

Once active control logic 306 computes the number of run-time floating-point operations per second (FLOPS) for the model with the refined grid, active control logic 306 determines whether the predicted model runtime (i.e. the total calculated number of FLOPS for the model with the refined grid to produce a forecast) is less than or equal to the user-defined constraint in which to provide the forecast (e.g. a common rule of thumb used in ocean and atmospheric modelling is that a 24 hour forecast should not take longer than 1 hour wall-clock time). If the predicted model runtime (i.e. the calculated number of FLOPS for all areas) is less than or equal to the user-defined constraint, active control logic 306 updates the gridded areas per the determination and simulation logic 304 continues with the simulation of oceanic circulation for the area using the updated grids, i.e. N by N grids for the areas where no significant event is occurring and N-n by N-n grids for the areas where a significant event is occurring, while utilizing the HPC resources as reallocated based upon the calculations. If the predicted model runtime (i.e. the calculated number of FLOPS for all areas) is more than the user-defined constraint, then the grid refinement is revised such that the subset of grids are N-m feet, miles, meters, or the like, between grid points, where N-m feet, miles, meters, or the like is larger than N-n feet, miles, meters, or the like, but smaller than N feet, miles, meters, or the like. Based on the refinement of the subset of grids, active control logic 306 again computes the number of run-time floating-point operations per second (FLOPS) for the refined model grid and determines whether the model runtime (i.e. the calculated number of FLOPS for all areas) is less than or equal to the user-defined constraint in which to provide the forecast.

Active control logic 306 and simulation logic 304 continue the process of refining the grids and allocation of HPC resources until the model grid and HPC compute resources ensure that, the model runtime meets with the user-defined constraints and/or an optimal resolution, i.e. a resolution value above the minimum resolution value, for each of the cells. Once the user-defined constraints and/or the optimal resolution are met based on the computed FLOPS of the refined model and available compute resources, simulation logic 304 outputs a final updated grid to storage 312, and the ocean circulation model proceeds with an updated grid resolution that targets precision based on event model forecasts. These produced event model(s) 310 may then be used in future forecasts until the event model again triggers the active control module logic.

Figure 4:
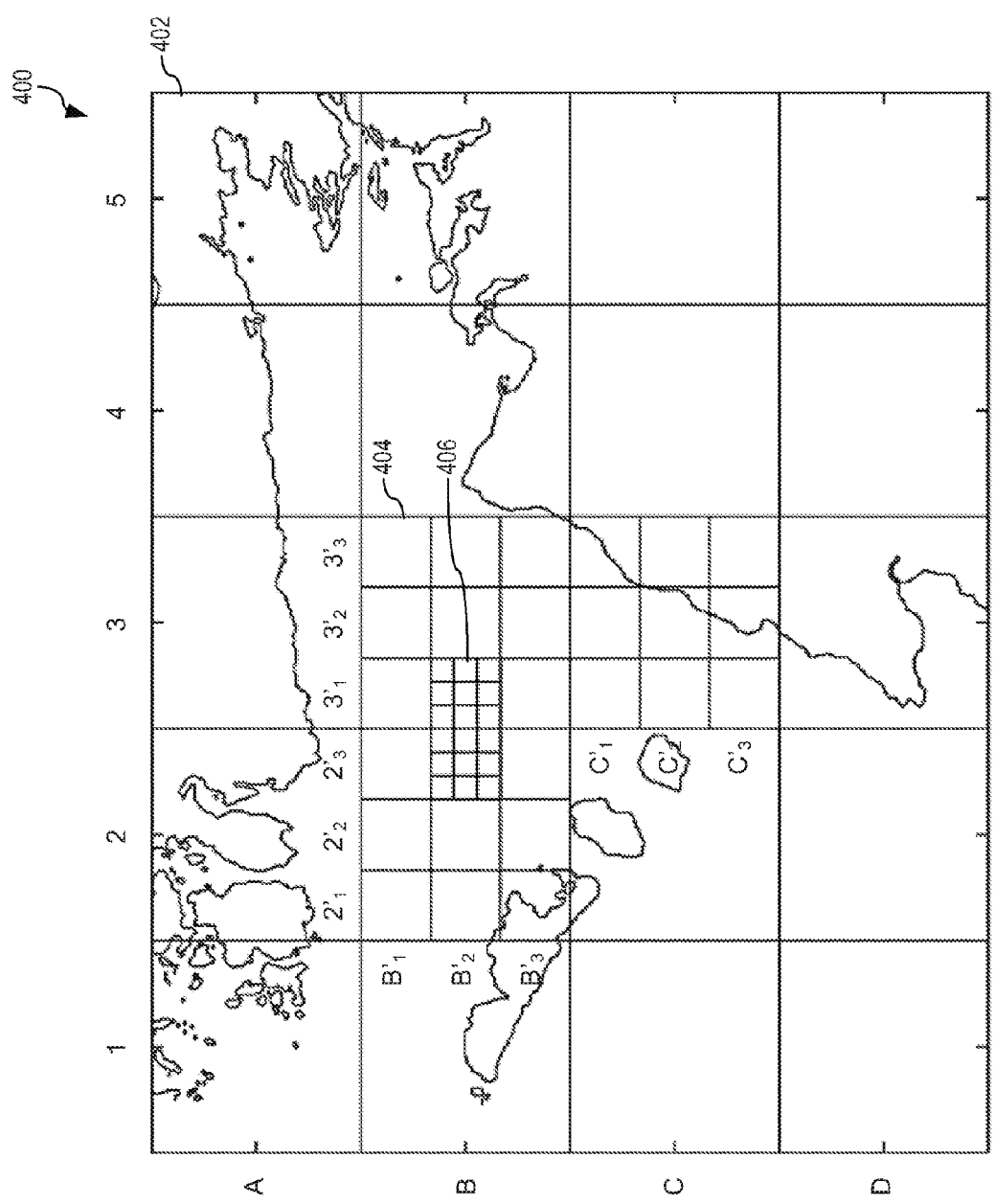
FIG. 4 depicts one example of the targeted, iterative refinement of an ocean circulation model grid resolution process in accordance with an illustrative embodiment.

FIG. 4 depicts one example of the targeted, iterative refinement of an ocean circulation model grid resolution process in accordance with an illustrative embodiment. In the example, the initialization logic module overlays an initial grid 402 over area 400. Concurrently, the initialization logic module identifies and accesses weather forecast data for the area that provides local event data pertinent to circulation processes in the waterbody. Based on the identification of a significant local event in cells B 2, B 3, and C 3, the forecast-based refinement and load-balancing mechanism activates a regridding of those cells resulting in regridded cells 404 and, as described above, quantifies the available UPC resources and reallocates the resources such that more resources are allocated to the area where the significant event is occurring, i.e. cells B 2, B 3, and C 3, and less resources are allocated to the other areas that do not have events occurring that are above the predetermined threshold of being a significant event. As is further illustrated in the example, after refinement of the grids, the forecast-based refinement and load-balancing mechanism identifies a significant event in cells $B'_2\ 2'_3$ and $B'_2\ 3'_1$. Based on the identification of an significant event in cells $B'_2\ 2'_3$, $B'_2\ 3'_1$, the forecast-based refinement and load-balancing mechanism activates a regridding of those cells resulting in regridded cells 406 and, as described above, quantifies the available HPC resources and reallocates the resources such that more resources are allocated to the area where the significant event is occurring, i.e. cells $B'_2\ 2'_3$ and $B'_2\ 3'_1$ and less resources are allocated to the other areas that do not have events occurring that are above the predetermined threshold of being a significant event.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 5:
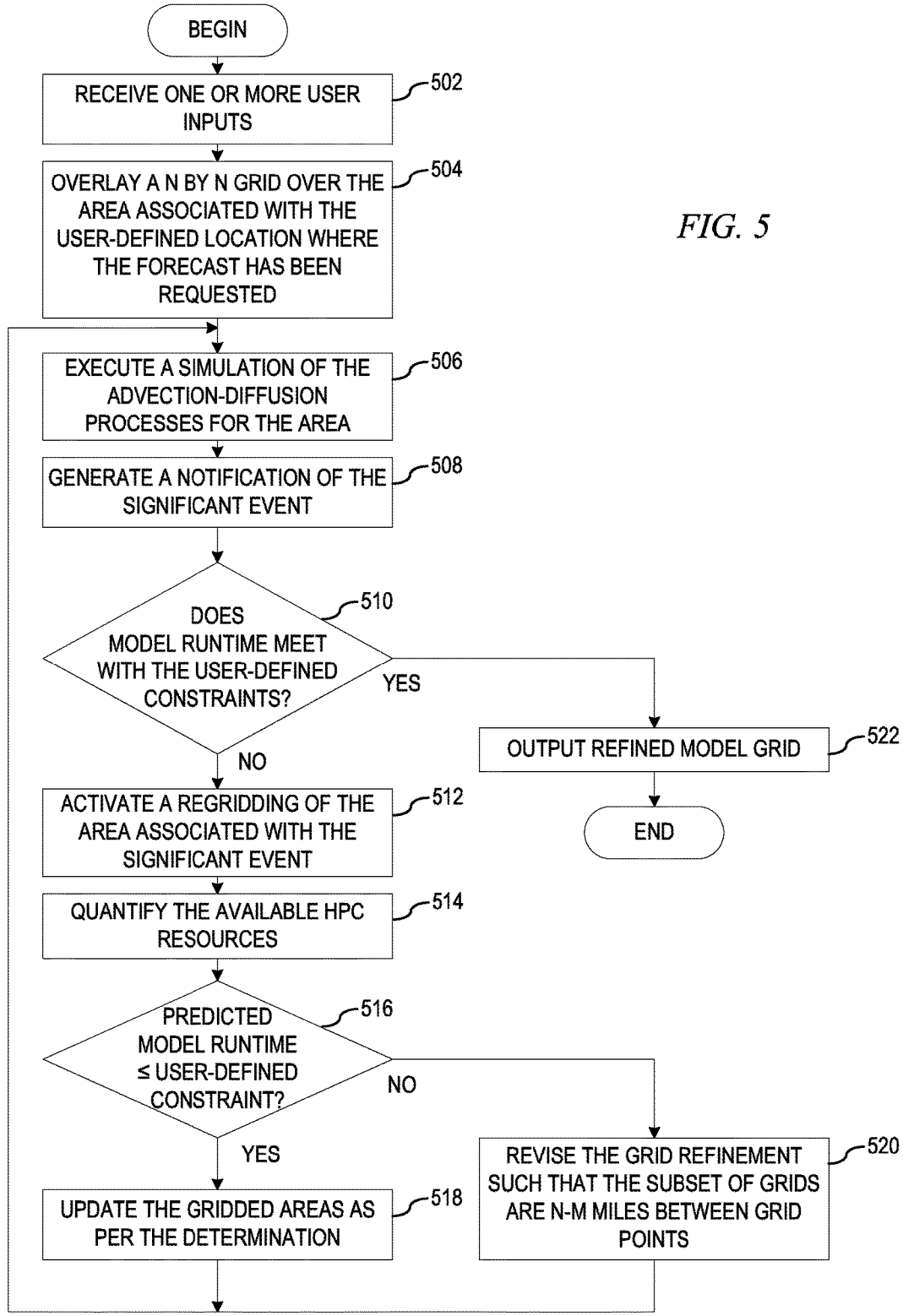
FIG. 5 depicts a flowchart of the operation performed by a forecast-based refinement and load-balancing mechanism for targeted, iterative refinement of advection-diffusion model grid resolution in response to predefined event forecasts in accordance with an illustrative embodiment.

FIG. 5 depicts a flowchart of the operation performed by a forecast-based refinement and load-balancing mechanism for targeted, iterative refinement of advection-diffusion model grid resolution in response to predefined event forecasts in accordance with an illustrative embodiment. As the operation begins, the forecast-based refinement and load-balancing mechanism receives one or more user inputs (step 502), the one or more user inputs being:

a set of rules, constraints, thresholds, or the like, such as a time constraint for providing an advection-diffusion model forecast for an area of interest (i.e. a model runtime), a minimum resolution for the area(s) where the forecast is being predicted, a set of thresholds for the forecast to be provided, or the like;

an advection-diffusion model with initial grid selection, i.e. a user-defined definition of the forecast that is being requested, such as ocean circulation, air quality, or the like, as well as the location where the forecast is being requested and a time frame for the forecast, i.e. 6 hours, 12 hours, 24, or the like;

event model forecast(s) pertinent to the advection-diffusion model above that is used to guide model grid refinement, such as wind speeds, power station flue releases, or the like; or available high-performance computing (HPC) resources, i.e. processing cores, memory, or the like, that are available to provide the forecast that is being requested.

Utilizing the input information, the forecast-based refinement and load-balancing mechanism overlays a N by N grid over the area or domain associated with the user-defined location where the forecast has been requested (step 504). That is, for the area of interest, a N by N grid of a base horizontal and vertical resolution of N feet, miles, meters, or the like between grid points may be overlaid over the area or domain associated with the user-defined location. Once the grid is overlaid, the forecast-based refinement and load-balancing mechanism executes a simulation of the advection-diffusion processes, such as ocean circulation, air quality model, or the like, for the area (step 506) utilizing, for example, currents, temperatures, salinty, density, or the like. In conjunction with this, event forecasts (e.g. wind speeds, power station flue releases, or the like) for the area or domain are accessed and connected to the forecast-based refinement and load balancing mechanism to identify pertinent events that are used to guide the local refinement of the circulation model in response to events. When the forecast-based refinement and load-balancing mechanism identifies a particular event (from the event model) within the gridded area that is above a predetermined threshold of being a significant event, e.g. high wind speeds, increased power station flue releases, the forecast-based refinement and load-balancing mechanism generates a notification of the significant event (step 508). At this point, the forecast-based refinement and load-balancing mechanism determines whether the model runtime meets with the user-defined constraints and/or an optimal resolution, i.e. a resolution value above the minimum resolution value, for each of the cells (step 510). If at step 510 the forecast-based refinement and load-balancing mechanism determines that the model runtime fails to meet with the user-defined constraints and/or the optimal resolution, the forecast-based refinement and load-balancing mechanism activates a regridding of the area associated with the significant event (step 512). That is, for the subset of grids associated with the area in which the significant event has been identified, the forecast-based refinement and load-balancing mechanism regrids the subset of grids such that the base horizontal resolution is N-n miles between grid points.

Based on the regridding and the subset of grids where the significant event is occurring, the forecast-based refinement and load-balancing mechanism quantifies the available HPC resources (step 514). In order to quantify the HPC resource for allocation, the forecast-based refinement and load-balancing mechanism computes the number of run-time floating-point operations per second (FLOPS) of the model to provide a forecast for both the subset of grids where the significant event is occurring and also the other grids where no significant event is occurring, while also meeting the user-defined constraints to provide a forecast within a predefined time window. That is, the refinement of the model grid, in response to significant events, introduces different HPC resource requirements that vary both in space, between regions where significant events are or are not occurring, and in time, in terms of the grid refinement in response to significant events.

Once the forecast-based refinement and load-balancing mechanism computes the total number of run-time floating-point operations per second (FLOPS) for the subset of grids as well as the other grids, the forecast-based refinement and load-balancing mechanism determines whether the predicted model runtime (i.e. the calculated number of FLOPS for all areas) is less than or equal to the user-defined constraint in which to provide the forecast (step 516). If at step 516 the forecast-based refinement and load-balancing mechanism determines that the predicted model runtime (i.e. the calculated number of FLOPS for all areas) is less than or equal to the user-defined constraint, the forecast-based refinement and load-balancing mechanism updates the gridded areas as per the determination (step 518), with the operation returning to step 506. If at step 516 the forecast-based refinement and load-balancing mechanism determines that the predicted model runtime (i.e. the calculated number of FLOPS for all areas) is more than the user-defined constraint, the forecast-based refinement and load-balancing mechanism revises the grid refinement such that the subset of grids are N-m feet, miles, meters, or the like, between grid points (step 520), where N-m feet, miles, meters, or the like, is larger than N-n feet, miles, meters, or the like, but smaller than N feet, miles, meters, or the like, with the operation returning to step 506 thereafter.

If at step 510 the forecast-based refinement and load-balancing mechanism determines that the model runtime meets with the user-defined constraints and/or an optimal resolution, i.e. a resolution value above the minimum resolution value, for each of the cells, the forecast-based refinement and load-balancing mechanism outputs the refined model grid for the advection-diffusion model (step 522), such as the ocean circulation model in the above example, although it could be any advection-diffusion model such as, air quality model, oil spill models, or the like, to storage. The produced advection-diffusion model(s) may then be used in future forecasts until the event model triggers another regridding from future forecasts. The operation ends thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for targeted, iterative refinement of advection-diffusion model grid resolution in response to predefined event forecasts. The mechanism automatically updates a model grid (e.g. grid for an ocean circulation model or air quality model) based on output from event model that provides pertinent forecasts, such as near-term weather forecasts, point source releases (e.g. from industry, power station flue gas releases, wastewater discharges, etc.), or the like. The mechanisms dynamically incorporates and/or releases high-performance computing (HPC) resources, whether user defined, computationally identified, or the like, to a current simulation. The mechanism automatically computes the model run-time and provides a targeted, iterative update of one or more model grids based on the available HPC resources, the event model, and user specified run-time constraints using a grid refinement algorithm and a monitoring and run-time algorithm that computes execute time of specified configuration. Thus, the mechanisms provide an increased precision of solution by combining spatial distribution of grid with available compute resources, and predefined, known model run-time, such as real-time operational capacity.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, hulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for targeted, iterative refinement of advection-diffusion model grid resolution in response to predefined event forecasts, the method comprising:
   executing a simulation of advection-diffusion processes for an area associated with a user-defined location where a forecast has been requested using a first set of resources, wherein, prior to execution of the simulation of advection-diffusion processes for the area, the area is overlayed with a dimensional N by N grid thereby forming a first set of cells and wherein the first set of resources is one or more of processing cores or memory;
   responsive to detecting an event within a subset of cells of the first set of cells, refining the subset of cells such that each of the subset of cells is gridded to comprise a second set of cells with dimensions less than the first set of cells, wherein the second set of cells has a subset of resources from the first set of resources thereby forming a second set of resources;
   computing a number of run-time floating-point operations per second (FLOPS) required to meet a predetermined resolution value for each of the first set of cells and the second set of cells;
   based on the computed number of FLOPS, reallocating resources from the first set of resources being utilized to provide the forecast for the first set of cells to a second set of resources being utilized to provide the forecast for the second set of cells;
   determining whether a collective time associated with the computed number of FLOPS exceeds a user-defined constraint for providing the forecast;
   responsive to the collective time failing to exceed the user-defined constraint, continuing to execute the simulation with the first set of cells and the second set of cells; and
   repeating the process of refinement of cells within the area until a resolution value above the predetermined resolution value for each of the cells is met.

2. The method of claim 1, wherein the event is a condition that affects the advection-diffusion process and thus guides the refinement of the subset of cells.

3. The method of claim 1, wherein the user-defined constraint is a maximum model runtime for providing the advection-diffusion model forecasts.

4. The method of claim 1, further comprising:
   responsive to the collective time exceeding the user-defined constraint, refining the subset of cells such that each of the subset of cells is gridded to comprise a different second set of cells with dimensions less than the first set of cells but with dimensions greater than the second set of cells.

5. The method of claim 1, wherein executing the simulation with the first set of cells and the second set of cells causes an equal amount of resources to be utilized for each of the first set of cells and the second set of cells.

6. The method of claim 1, further comprising:
   responsive to meeting the user-defined resolution for each of the cells, outputting the refined model grid for the advection-diffusion model for use in future forecasts until another event triggers another regridding from future forecasts.

7. A computer program product comprising a non-transitory computer readable storage medium having a computer readable program stored therein, wherein the computer readable program, when executed on a computing device, causes the computing device to:
   execute a simulation of advection-diffusion processes for an area associated with a user-defined location where a forecast has been requested using a first set of resources, wherein, prior to execution of the simulation of advection-diffusion processes for the area, the area is overlayed with a dimensional N by N grid thereby forming a first set of cells and wherein the first set of resources is one or more of processing cores or memory;
   responsive to detecting an event within a subset of cells of the first set of cells, refine the subset of cells such that each of the subset of cells is gridded to comprise a second set of cells with dimensions less than the first set of cells, wherein the second set of cells has a subset of resources from the first set of resources thereby forming a second set of resources;
   compute a number of run-time floating-point operations per second (FLOPS) required to meet a predetermined resolution value for each of the first set of cells and the second set of cells;
   based on the computed number of FLOPS, reallocate resources from the first set of resources being utilized to provide the forecast for the first set of cells to a second set of resources being utilized to provide the forecast for the second set of cells;
   determine whether a collective time associated with the computed number of FLOPS exceeds a user-defined constraint for providing the forecast;
   responsive to the collective time failing to exceed the user-defined constraint, continue to execute the simulation with the first set of cells and the second set of cells; and
   repeat the process of refinement of cells within the area until a resolution value above the predetermined resolution value for each of the cells is met.

8. The computer program product of claim 7, wherein the event is a condition that affects the advection-diffusion process and thus guides the refinement of the subset of cells.

9. The computer program product of claim 7, wherein the user-defined constraint is a maximum model runtime for providing the advection-diffusion model forecasts.

10. The computer program product of claim 7, wherein the computer readable program further causes the computing device to:
   responsive to the collective time exceeding the user-defined constraint, refine the subset of cells such that each of the subset of cells is gridded to comprise a different second set of cells with dimensions less than the first set of cells but with dimensions greater than the second set of cells.

11. The computer program product of claim 7, wherein the computer readable program to execute the simulation with the first set of cells and the second set of cells causes an equal amount of resources to be utilized for each of the first set of cells and the second set of cells.

12. The computer program product of claim 7, wherein the computer readable program further causes the computing device to:
responsive to meeting the user-defined resolution for each of the cells, output the refined model grid for the advection-diffusion model for use in future forecasts until another event triggers another regridding from future forecasts.

13. An apparatus comprising:
a processor; and
a memory coupled to the processor, wherein the memory comprises instructions which, when executed by the processor, cause the processor to:
execute a simulation of advection-diffusion processes for an area associated with a user-defined location where a forecast has been requested using a first set of resources, wherein, prior to execution of the simulation of advection-diffusion processes for the area, the area is overlayed with a dimensional N by N grid thereby forming a first set of cells and wherein the first set of resources is one or more of processing cores or memory;
responsive to detecting an event within a subset of cells of the first set of cells, refine the subset of cells such that each of the subset of cells is gridded to comprise a second set of cells with dimensions less than the first set of cells, wherein the second set of cells has a subset of resources from the first set of resources thereby forming a second set of resources;
a number of run-time floating-point operations per second (FLOPS) required to meet a predetermined resolution value for each of the first set of cells and the second set of cells;
based on the computed number of FLOPS, reallocate resources from the first set of resources being utilized to provide the forecast for the first set of cells to a second set of resources being utilized to provide the forecast for the second set of cells;
determine whether a collective time associated with the computed number of FLOPS exceeds a user-defined constraint for providing the forecast;
responsive to the collective time failing to exceed the user-defined constraint, continue to execute the simulation with the first set of cells and the second set of cells; and
repeat the process of refinement of cells within the area until a resolution value above the predetermined resolution value for each of the cells is met.

14. The apparatus of claim 13, wherein the event is a condition that affects the advection-diffusion process and thus guides the refinement of the subset of cells.

15. The apparatus of claim 13, wherein the user-defined constraint is a maximum model runtime for providing the advection-diffusion model forecasts.

16. The apparatus of claim 13, wherein the instructions further cause the processor to:
responsive to the collective time exceeding the user-defined constraint, refine the subset of cells such that each of the subset of cells is gridded to comprise a different second set of cells with dimensions less than the first set of cells but with dimensions greater than the second set of cells.

17. The apparatus of claim 13, wherein the instructions to execute the simulation with the first set of cells and the second set of cells causes an equal amount of resources to be utilized for each of the first set of cells and the second set of cells.

18. The apparatus of claim 13, wherein the instructions further cause the processor to:
responsive to meeting the user-defined resolution for each of the cells, output the refined model grid for the advection-diffusion model for use in future forecasts until another event triggers another regridding from future forecasts.

* * * * *